US012065201B2

(12) United States Patent
Kwon et al.

(10) Patent No.: US 12,065,201 B2
(45) Date of Patent: Aug. 20, 2024

(54) METHOD OF MANUFACTURING A MOVEABLE OBJECT (71) Applicants: Hyundai Motor Company, Seoul (KR); Kia Corporation, Seoul (KR)

(72) Inventors: Seok Ryung Kwon, Seoul (KR); Hyeon Sik Shin, Gyeonggi-do (KR); Pan Keun Baek, Gyeonggi-do (KR); Jun Hwan Park, Seoul (KR); Hun Keon Ko, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 17 days.

(21) Appl. No.: 18/139,170

(22) Filed: Apr. 25, 2023

(65) Prior Publication Data
US 2023/0257019 A1 Aug. 17, 2023

Related U.S. Application Data (62) Division of application No. 17/481,631, filed on Sep. 22, 2021, now Pat. No. 11,673,603.

(30) Foreign Application Priority Data

Mar. 19, 2021 (KR) .......................... 10-2021-0036199

(51) Int. Cl.
*B62D 5/04* (2006.01)
*B62D 65/12* (2006.01)
(52) U.S. Cl.
CPC .......... *B62D 5/0418* (2013.01); *B62D 65/12* (2013.01)

(58) Field of Classification Search
CPC .............................. B62D 5/0418; B62D 65/12
See application file for complete search history.

(56) References Cited

U.S. PATENT DOCUMENTS

| 10,668,926 | B2  | 6/2020  | Bimschein et al. |
| 10,737,737 | B2  | 8/2020  | Birnschein et al. |
| 10,843,744 | B2  | 11/2020 | Cha et al. |
| 2020/0180706 | A1 | 6/2020 | Cha et al. |
| 2020/0239068 | A1* | 7/2020 | Hallundbæk ............ B62D 7/18 |

(Continued)

FOREIGN PATENT DOCUMENTS

| CN | 209037656 U | 6/2019 |
| DE | 102019106839 A1 | 9/2020 |
| GB | 2582640 A | 9/2020 |

(Continued)

*Primary Examiner* — Rick K Chang
(74) *Attorney, Agent, or Firm* — Fox Rothschild LLP (57) ABSTRACT A method of manufacturing a movable object is provided. The method includes a preparation step of preparing a wheel, a steering part including a wheel rod connected to the wheel and a steering motor rotating the wheel rod to steer the wheel, and a cover part including a receiving member in which a portion of the steering part is received. The method further includes an engagement step of joining the steering part and the cover part by engaging the steering part with the receiving member. The method additionally includes a disengagement step of disengaging the steering part from the cover part by separating the steering part from the receiving member. In the engagement step, the steering part and the cover part are joined by driving the steering motor to rotate the wheel rod in one direction.

9 Claims, 4 Drawing Sheets (56) References Cited

U.S. PATENT DOCUMENTS

2020/0398915 A1* 12/2020 Birnschein ............... B60Q 1/04

FOREIGN PATENT DOCUMENTS

| KR | 10-2029678 B1 | 10/2019 |
|----|---------------|---------|
| KR | 2020-0012858 A | 2/2020 |
| KR | 2020-0071898 A | 6/2020 |
| WO | 2020-259833 A1 | 12/2020 |

* cited by examiner

METHOD OF MANUFACTURING A MOVEABLE OBJECT

CROSS-REFERENCE TO RELATED APPLICATION

This Application is a Divisional of application Ser. No. 17/481,631 filed on Sep. 22, 2021. Application Ser. No. 17/481,631 claims under 35 U.S.C. § 119(a) the benefit of Korean Patent Application No. 10-2021-0036199, filed on Mar. 19, 2021, which is hereby incorporated by reference herein.

BACKGROUND

(a) Technical Field

The present disclosure relates to a movable object and a method of manufacturing the same.

(b) Description of the Related Art

In general, a platforming strategy for designing a vehicle platform that shares some common parts is widely used in the mobility manufacturing industry including automobiles for reasons of cost reduction and ease of design change due to economies of scale.

In particular, there are methods of manufacturing various types of electric vehicles according to the vehicles' purposes by building one lower platform and fixing various types of upper frames to the corresponding lower platform. For example, different types of mobility may be manufactured as needed by installing upper frames appropriate for the purposes of various modified vehicles such as food trucks, ambulances, unmanned delivery, or the like on a lower platform where a driving unit is mounted, or by replacing the existing upper frame with the upper frames for the other purposes. This is called "purpose-based mobility" or "purpose built vehicle (PBV)", which represents the foundation of future industries proposed by various mobility manufacturers.

However, since the mobility includes complex structures and many types of parts/components, it may require a significant amount time and manpower to install the upper frame on the lower platform or replace the upper frame installed on the lower platform with another upper frame.

SUMMARY

An aspect of the present disclosure provides a movable object and a method of manufacturing a movable object, capable of reducing the time and manpower required for assembly or disassembly of an upper frame and a lower platform during a process of manufacturing the movable object.

According to an aspect of the present disclosure, a movable object may include: a steering part including a wheel provided to rotate along a ground, a wheel rod connected to the wheel and extending in a direction away from the wheel, and a steering motor connected to the wheel rod to rotate the wheel rod and steer the wheel; and a cover part disposed on top of the steering part, and including a receiving member in which a portion of the steering part is received. When the steering motor rotates the wheel rod in one direction, the steering part may be engaged with the receiving member so that the steering part and the cover part may be joined, and when the steering motor rotates the wheel rod in an opposite direction, the steering part may be separated from the receiving member so that the steering part and the cover part may be disengaged.

The steering part may further include an insertion rod connectable to an upper region of the wheel rod and extending from the wheel rod toward the receiving member, the receiving member may have a receiving hole provided in a lower portion of the cover part and allowing the insertion rod to be inserted thereinto, when the steering motor rotates the wheel rod in the one direction, the insertion rod may be inserted into the receiving hole so that the steering part and the cover part may be joined, and when the steering motor rotates the wheel rod in the opposite direction, the insertion rod may be separated from the receiving hole so that the steering part and the cover part may be disengaged.

An upper region of the insertion rod may have a screw bolt structure, and the receiving hole may have a shape corresponding to that of the bolt structure of the insertion rod.

The insertion rod may have a recess which is concave upward from a portion of a lower region of the insertion rod facing the wheel rod, and an outer circumferential surface of the upper region of the wheel rod may have a shape corresponding to that of an inner circumferential surface of the recess.

The steering part may further include a linear motor moving the wheel rod upwardly or downwardly.

The steering part may further include a decoupling member which mediates or blocks power transfer from the steering motor to a lower region of the wheel rod connected to the wheel.

A first thread structure may be provided in the outer circumferential surface of the upper region of the wheel rod, and a second thread structure corresponding to the first thread structure may be provided in the inner circumferential surface of the recess.

When the wheel rod is inserted into the recess and the linear motor moves the wheel rod upwardly, the wheel rod may press the insertion rod upwardly due to interference between the wheel rod and the insertion rod and move the insertion rod upwardly.

The movable object may further include a base part disposed between the steering part and the cover part and having a through hole allowing the wheel rod to pass therethrough. The wheel rod may pass through the through hole and be received in the receiving member.

The linear motor may be disposed above the steering motor.

According to another aspect of the present disclosure, a method of manufacturing a movable object may include: a preparation step of preparing a wheel, a steering part including a wheel rod connected to the wheel and a steering motor rotating the wheel rod to steer the wheel, and a cover part including a receiving member in which a portion of the steering part is received; an engagement step of joining the steering part and the cover part by engaging the steering part with the receiving member; and a disengagement step of disengaging the steering part from the cover part by separating the steering part from the receiving member. In the engagement step, the steering part and the cover part may be joined by driving the steering motor to rotate the wheel rod in one direction.

In the disengagement step, the steering part and the cover part may be disengaged by driving the steering motor to rotate the wheel rod in an opposite direction.

The steering part may further include an insertion rod connectable to an upper region of the wheel rod, and the engagement step may further include inserting the insertion rod into the receiving member by driving the steering motor to rotate the wheel rod in the one direction.

The disengagement step may further include separating the insertion rod from the receiving member by driving the steering motor to rotate the wheel rod in the opposite direction.

The engagement step may further include connecting the wheel rod to the insertion rod to allow the wheel rod and the insertion rod to rotate together.

The disengagement step may further include separating the wheel rod from the insertion rod.

In the engagement step, the steering part and the cover part may be joined after the wheel rod is decoupled from the steering motor so that power transfer from the steering motor to the wheel rod may be blocked.

In the engagement step, after the steering part and the cover part are joined, the wheel rod and the steering motor may be coupled so that power transfer may be made from the steering motor to the wheel rod.

The method may further include an alignment step of aligning each wheel which is provided on the steering part, and the alignment step may be performed between the preparation step and the engagement step.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Figure 1:
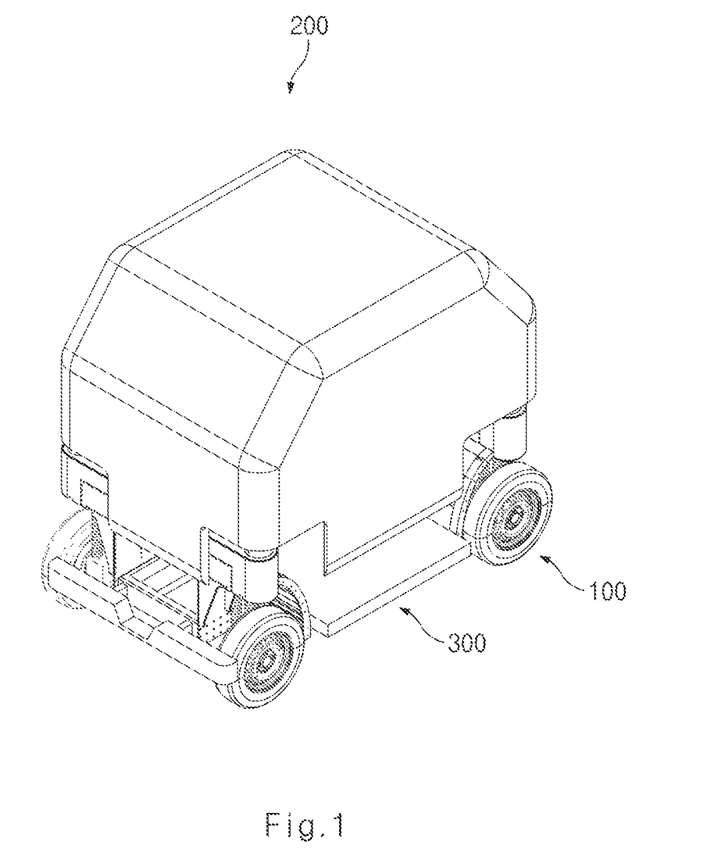
FIG. 1 illustrates a perspective view of a movable object according to an exemplary embodiment of the present disclosure.
Figure 2:
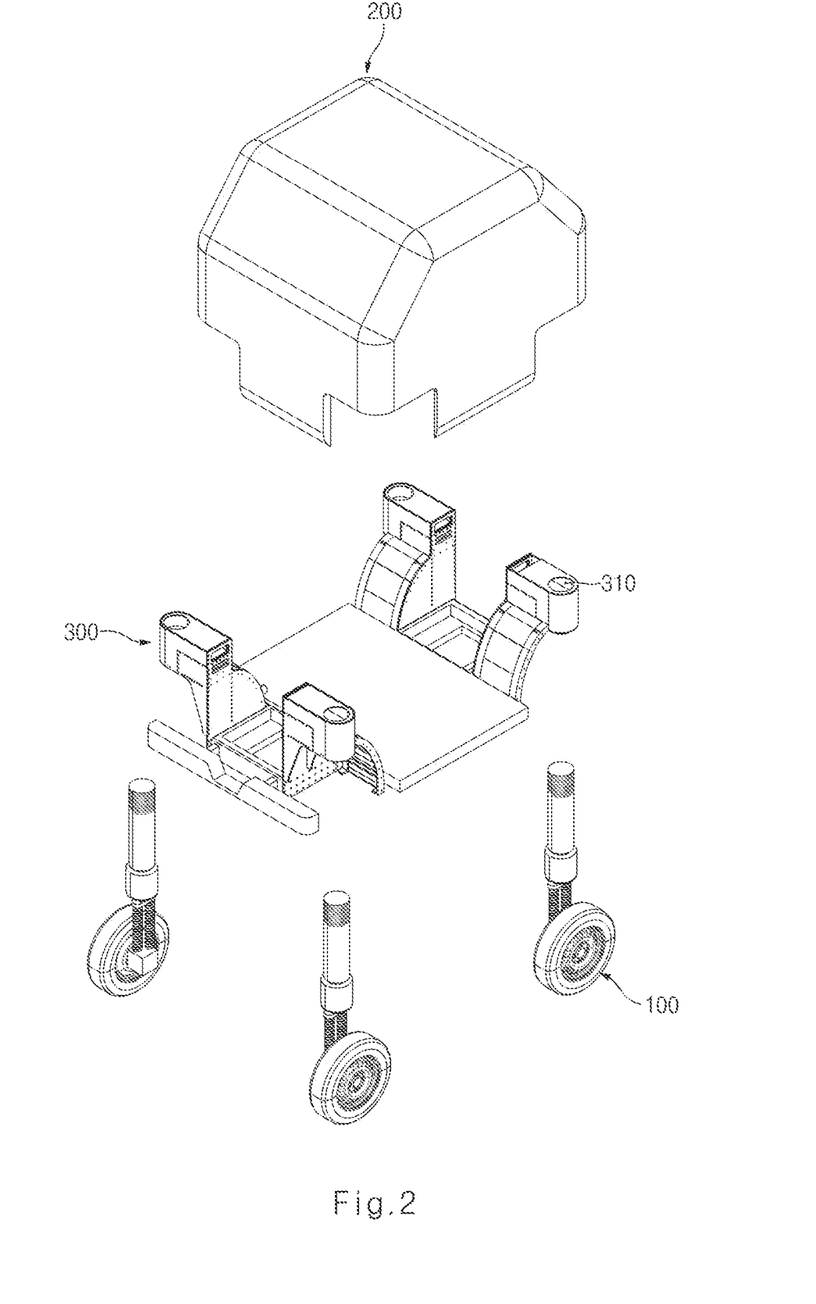
FIG. 2 illustrates an exploded perspective view of a movable object according to an exemplary embodiment of the present disclosure.
Figure 3:
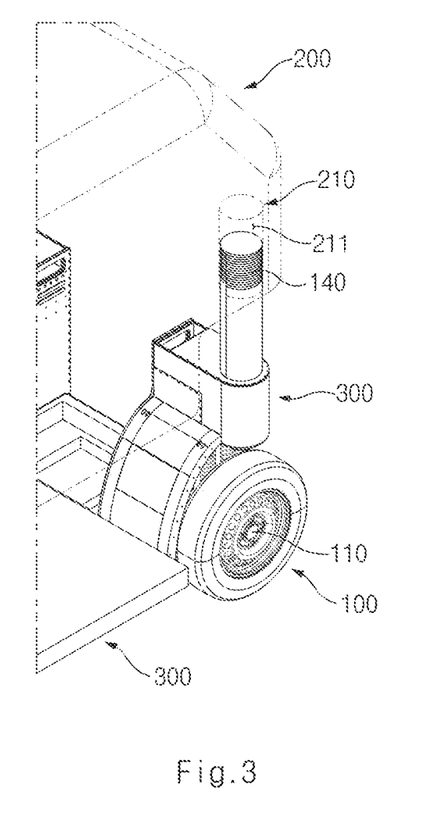
FIG. 3 illustrates a perspective view of the joining of a steering part, a base part, and a cover part according to an exemplary embodiment of the present disclosure.

FIG. 1 illustrates a perspective view of a movable object according to an exemplary embodiment of the present disclosure; FIG. 2 illustrates an exploded perspective view of a movable object according to an exemplary embodiment of the present disclosure; FIG. 3 illustrates a perspective view of the joining of a steering part, a base part, and a cover part according to an exemplary embodiment of the present disclosure; and FIG. 4 illustrates a cross-sectional view of a steering part according to an exemplary embodiment of the present disclosure.

As illustrated in FIGS. 1 to 4, a movable object according to exemplary embodiments of the present disclosure may include a steering part 100 and a cover part 200. The movable object may be formed by quickly assembling the steering part 100 and one of various types of cover parts 200 fit for a specific purpose. The cover part 200 may be configured to cover an upper region of the movable object.

Figure 4:
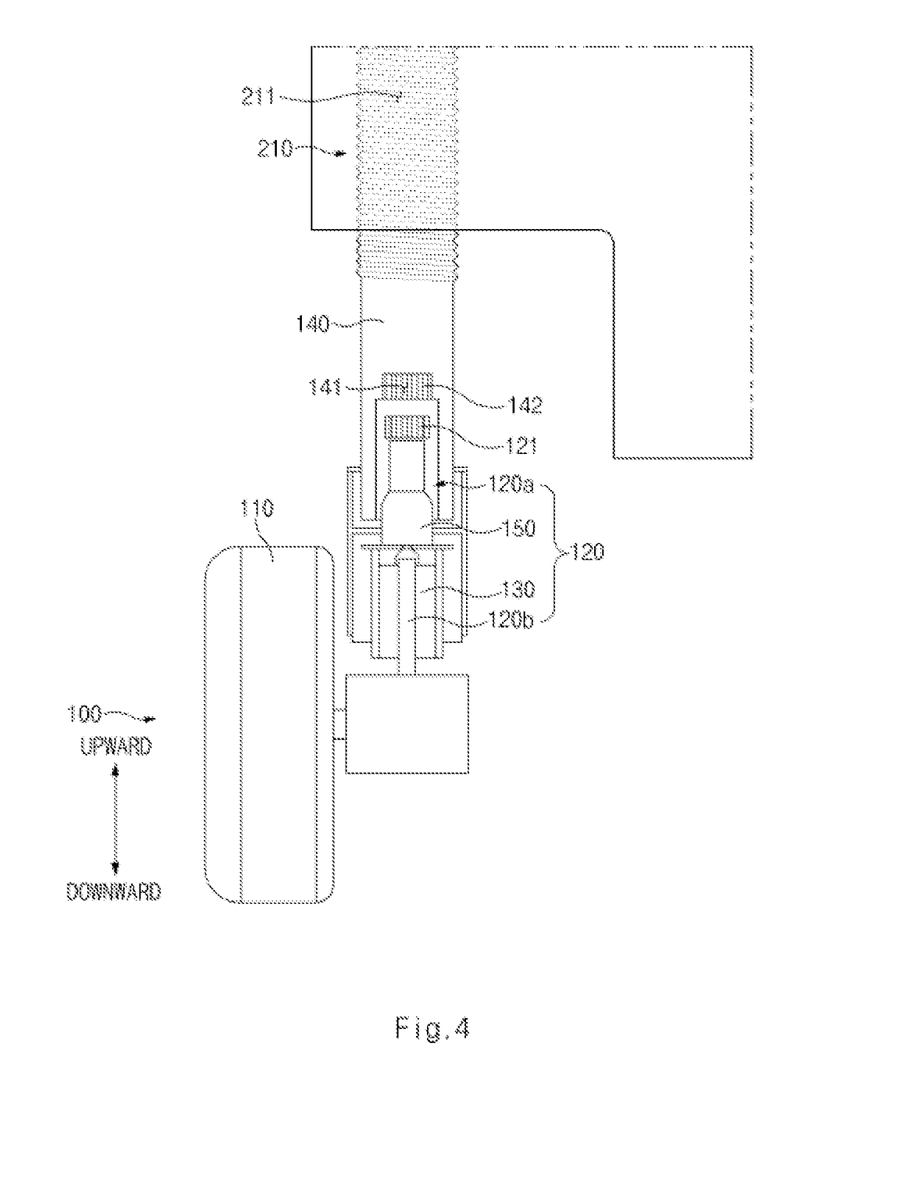
FIG. 4 illustrates a cross-sectional view of a steering part according to an exemplary embodiment of the present disclosure.

As illustrated in FIG. 4, the steering part 100 may include a wheel 110, a wheel rod 120, and a steering motor 130. The wheel 110 may rotate on an axis extending parallel to the ground by a separate electric motor (not shown) so that the wheel 110 may rotate along the ground. By the rotation of the wheels 110, the movable object may move along the ground.

The wheel rod 120 may be connected to the wheel 110 and extend in a direction away from the wheel 110. For example, the wheel rod 120 may extend upwardly from the wheel 110 (see FIG. 4).

The steering motor 130 may be an electric motor that converts electric energy into rotational kinetic energy. The steering motor 130 may be connected to the wheel rod 120 to rotate the wheel rod 120. As the steering motor 130 rotates the wheel rod 120, the wheel 110 connected to the wheel rod 120 may rotate on the wheel rod 120 serving as a shaft. As the wheel 110 is rotated by the rotation of the steering motor 130, the wheel 110 may be steered, and the movable object may be steered accordingly. In addition, the steering motor 130 may be used for joining and separating (engagement and disengagement) of the steering part 100 and the cover part 200 to be described below.

As illustrated in FIGS. 1 and 2, the cover part 200 may be disposed on top of the steering part 100. In addition, as illustrated in FIGS. 3 and 4, a receiving member 210 in which a portion of the steering part 100 is received may be provided in a lower portion of the cover part 200. As the steering part 100 is partially received in the receiving member 210, the cover part 200 and the steering part 100 may be joined to each other.

Joining between the steering part 100 and the cover part 200 may be performed by the steering motor 130. That is, according to exemplary embodiments of the present disclosure, as the steering motor 130 rotates the wheel rod 120 in one direction, a portion of the steering part 100 may be engaged with the receiving member 210 so that the steering part 100 and the cover part 200 may be joined to each other.

According to exemplary embodiments of the present disclosure, the disengagement of the steering part 100 and the cover part 200 may also be performed by the steering motor 130. That is, as the steering motor 130 rotates the wheel rod 120 in the opposite direction (i.e., opposite to the one direction), the portion of the steering part 100 may be separated from the receiving member 210 so that the steering part 100 and the cover part 200 may be disengaged.

According to exemplary embodiments of the present disclosure, by assembling the steering part 100 and the cover part 200 using the steering motor 130, the assembly method and assembly structure of the movable object may be simplified, and the time and manpower required for assembly may be reduced. In addition, by joining the steering part 100 and the cover part 200 having various sizes and structures according to purposes of the movable object, various types of movable objects may be used for various applications.

As illustrated in FIG. 4, the steering part 100 according to an exemplary embodiment of the present disclosure may further include an insertion rod 140. The insertion rod 140 may be connectable to an upper region 120a of the wheel rod 120 and extend from the wheel rod 120 toward the receiving member 210. Here, the upper region 120a of the wheel rod 120 may include a separate member which is coupled to an upper portion of the wheel rod 120 through another element/component. That is, the insertion rod 140 may be directly connected to the wheel rod 120 or may be indirectly connected to the wheel rod 120 through another member. When the wheel rod 120 and the insertion rod 140 are connected, the insertion rod 140 may rotate together with the wheel rod 120.

The receiving member 210 may have a receiving hole 211. The receiving hole 211 may be provided in the lower portion of the cover part 200. The receiving hole 211 may be recessed upwardly from the lower portion of the cover part 200 so that the insertion rod 140 may be inserted into the receiving hole 211. The shape of the receiving hole 211 may correspond to that of the insertion rod 140.

When the wheel rod 120 rotates in the one direction by the driving of the steering motor 130, the insertion rod 140 directly or indirectly connected to the wheel rod 120 may also rotate with the wheel rod 120 in the one direction. While rotating, the insertion rod 140 may be inserted into the receiving hole 211 so that the steering part 100 and the cover part 200 may be joined to each other.

In addition, the insertion rod 140 may rotate together with the wheel rod 120 in the opposite direction (i.e., opposite to the one direction) by the driving of the steering motor 130. While rotating, the insertion rod 140 may be separated from the receiving hole 211 so that the steering part 100 and the cover part 200 may be disengaged.

According to an exemplary embodiment of the present disclosure, since the insertion rod 140 is provided, a user may selectively allow the steering motor 130 to intervene in engagement or disengagement of the steering part 100 and the cover part 200. That is, when the insertion rod 140 is connected to the wheel rod 120, the user may cause the steering part 100 and the cover part 200 to be engaged or disengaged through the rotation of the steering motor 130. On the other hand, when the insertion rod 140 and the wheel rod 120 are separated from each other, the user may allow the wheel 110 to be steered through the rotation of the steering motor 130 without intervention in the engagement of the steering part 100 and the cover part 200.

An upper region of the insertion rod 140 may have a screw bolt structure, and an internal surface of the receiving hole 211 may have a nut shape corresponding to the bolt structure of the insertion rod 140. Thus, a bolt-nut connection may be made between the insertion rod 140 and the receiving hole 211, and as a result, the steering part 100 and the cover part 200 may be more effectively joined to each other.

A recess 141 may be formed in the insertion rod 140. The recess 141 may be disposed in a portion of a lower region of the insertion rod 140 facing the wheel rod 120, and may be recessed upwardly and concavely. As the upper region 120a of the wheel rod 120 is inserted into the recess 141, the insertion rod 140 and the wheel rod 120 may be connected to each other.

An outer circumferential surface of the upper region 120a of the wheel rod 120 may have a shape corresponding to that of an inner circumferential surface of the recess 141. As the outer circumferential surface of the upper region 120a of the wheel rod 120 and the inner circumferential surface of the recess 141 have the corresponding shape, the insertion rod 140 and the wheel rod 120 may be connected more effectively.

Meanwhile, a first thread structure (external thread) 121 may be formed on the outer circumferential surface of the upper region 120a of the wheel rod 120, and a second thread structure (internal thread) 142 corresponding to the first thread structure 121 may be formed on the inner circumferential surface of the recess 141. That is, the wheel rod 120 and the insertion rod 140 may be engaged with each other through the thread structures with an increased clamping force therebetween.

The steering part 100 according to an exemplary embodiment of the present disclosure may further include a linear motor 150. For example, the linear motor 150 may be disposed above the steering motor 130. However, the position of the linear motor 150 is not limited thereto. The linear motor 150 may move the wheel rod 120 upwardly so that the wheel rod 120 may be connected to the insertion rod 140, or move the wheel rod 120 downwardly so that the wheel rod 120 may be separated from the insertion rod 140.

In addition, the linear motor 150 may move the wheel rod 120 upwardly to cause the wheel rod 120 to be inserted into the recess 141, and then move the wheel rod 120 further upwardly to cause the wheel rod 120 to move the insertion rod 140 upwardly. That is, the linear motor 150 may cause the wheel rod 120 and the insertion rod 140 to be connected to each other, and cause the insertion rod 140 to be inserted into the receiving hole 211.

In other words, the linear motor 150 may be configured to drive the wheel rod 120 to cause the insertion rod 140 and the wheel rod 120 to be engaged or disengaged, and cause the insertion rod 140 to be engaged with or disengaged from the receiving member 210.

More specifically, according to an exemplary embodiment of the present disclosure, when the linear motor 150 continues to drive and move the wheel rod 120 upwardly even after the wheel rod 120 is inserted into the recess 141 by the driving of the linear motor 150, the wheel rod 120 may press the insertion rod 140 upwardly due to interference between the wheel rod 120 and the insertion rod 140 and move the insertion rod 140 upwardly. Thus, the insertion rod 140 may be engaged with the receiving member 210.

The steering part 100 according to an exemplary embodiment of the present disclosure may further include a decoupling member. The decoupling member may be disposed between the steering motor 130 and the wheel rod 120 to mediate or block the transfer of power from the steering motor 130 to a lower region 120*b* of the wheel rod 120.

For example, in a process of joining the steering part 100 and the cover part 200 using the steering motor 130, the decoupling member may block the steering motor 130 from transferring power to the lower region 120*b* of the wheel rod 120. On the other hand, in order to steer the movable object using the steering motor 130 in a normal driving process of the movable object, the decoupling member may mediate between the steering motor 130 and the wheel rod 120 to allow the steering motor 130 to transfer power to the lower region 120*b* of the wheel rod 120.

As the decoupling member is provided, the user may selectively allow the steering motor 130 to steer the wheel 110 as needed. As a result, a tire mounted on the wheel 110 may be prevented from being worn due to the rotation of the wheel rod during the assembly process of the steering part 100 and the cover part 200.

As illustrated in FIG. 2, the movable object according to an exemplary embodiment of the present disclosure may further include a base part 300. The base part 300 may form a frame of a lower region of the movable object. The base part 300 may have a through hole 310 into which a portion of the steering part 100 is inserted. More specifically, the base part 300 may be disposed between the steering part 100 and the cover part 200, and the through hole 310 may allow the wheel rod 120 (see FIG. 4) to pass therethrough. In addition, as illustrated in FIG. 3, the through hole 310 (see FIG. 2) of the base part 300 and the receiving hole 211 of the cover part 200 may face each other in a vertical direction. The individual elements constituting the steering part 100 may be connected to the base part 300 and the cover part 200 so that they may be firmly assembled to form the movable object.

Hereinafter, a method of manufacturing a movable object according to exemplary embodiments of the present disclosure will be described. The same reference numerals will be used to designate the same or equivalent elements as those of the movable object according to the above-described exemplary embodiments of the present disclosure, and a detailed description of those elements will be omitted.

The method of manufacturing a movable object according to exemplary embodiments of the present disclosure relates to a method of manufacturing the movable object by assembling the steering part 100 including the steering motor 130 and the cover part 200 using the steering motor 130 by which the movable object is steered. The cover part 200 may include various types of platforms that may be easily changed according to purpose. The user may easily join the cover part 200 and the steering part 100 or disengage them from their engagement using the steering motor 130.

The method of manufacturing a movable object according to exemplary embodiments of the present disclosure may include the following steps: a preparation step, an engagement step, and a disengagement step.

In the preparation step, the following elements may be prepared: the wheel 110; the steering part 100 including the wheel rod 120 connected to the wheel 110 and the steering motor 130 rotating the wheel rod 120 to steer the wheel 110; and the cover part 200 including the receiving member 210 in which a portion of the steering part 100 is received. The preparation step may further include preparing the base part 300 between the steering part 100 and the cover part 200.

The engagement step may be a step of joining the steering part 100 and the cover part 200 by engaging a portion of the steering part 100 with the receiving member 210. More specifically, in the engagement step, the steering part 100 and the cover part 200 may be joined by driving of the steering motor 130 to rotate the wheel rod 120 in the one direction.

The disengagement step may be a step of disengaging the steering part 100 from the cover part 200 by separating a portion of the steering part 100 from the receiving member 210.

According to an exemplary embodiment of the present disclosure, the steering part 100 may further include the insertion rod 140 connectable to the upper region 120*a* of the wheel rod 120.

In this case, in the engagement step, the insertion rod 140 and the wheel rod 120 may be connected to each other so that the wheel rod 120 and the insertion rod 140 may rotate together. The connection of the wheel rod 120 and the insertion rod 140 may be made by inserting the upper region 120*a* of the wheel rod 120 into the recess 141 provided in the lower region of the insertion rod 140 using the linear motor 150.

In addition, according to an exemplary embodiment of the present disclosure, the engagement step may include inserting the insertion rod 140 into the receiving hole 211 of the receiving member 210 by continuously driving the steering motor 130 to rotate the wheel rod 120 in the one direction even after the wheel rod 120 and the insertion rod 140 are connected to each other.

That is, according to an exemplary embodiment of the present disclosure, the insertion rod 140 may be inserted into the receiving hole 211 in the engagement step, so that joining between the steering part 100 and the cover part 200 may be achieved.

In addition, in the engagement step according to an exemplary embodiment of the present disclosure, the steering part 100 and the cover part 200 may be joined after the lower region 120*b* of the wheel rod 120 is decoupled from the steering motor 130 so that the transfer of power from the steering motor 130 to the lower region 120*b* of the wheel rod 120 may be blocked. Thus, as the lower region 120*b* of the wheel rod 120 and the steering motor 130 are decoupled from each other in the engagement step, the steering motor 130 may rotate the insertion rod 140 connected to the upper region 120*a* of the wheel rod 120 to join the steering part 100 and the cover part 200, without rotating the wheel 110 connected to the lower region 120*b* of the wheel rod 120 in a steering direction. Thus, in the engagement step, the wheel 110 may be prevented from being worn by the driving of the steering motor 130.

Meanwhile, in the engagement step, after the steering part 100 and the cover part 200 are joined, the lower region 120b of the wheel rod 120 and the steering motor 130 may be coupled so that power may be transferred from the steering motor 130 to the lower region 120b of the wheel rod 120. Thus, after the joining of the steering part 100 and the cover part 200 is completed, the wheel 110 may be steerable again by the steering motor 130.

The method of manufacturing a movable object according to an exemplary embodiment of the present disclosure may further include an alignment step, in which each wheel 110 provided on the steering part 100 may be aligned. The alignment step may be performed between the preparation step and the engagement step. By performing the engagement step in a state in which the wheels 110 are aligned, the wheels 110 may be maintained in an aligned state even after the joining of the steering part 100 and the cover part 200 is completed.

In the disengagement step according to an exemplary embodiment of the present disclosure, the steering part 100 and the cover part 200 may be disengaged by driving the steering motor 130 to rotate the wheel rod 120 in the opposite direction (i.e., opposite to the one direction).

In addition, in the disengagement step, the wheel rod 120 may be connected to the insertion rod 140 provided to be interlocked with the wheel rod 120 before the steering motor 130 rotates the wheel rod 120 in the opposite direction to disengage the steering part 100 from the cover part 200. Similar to the engagement step, the connection of the wheel rod 120 and the insertion rod 140 may be made by inserting the upper region 120a of the wheel rod 120 into the recess 141 provided in the lower region of the insertion rod 140 using the linear motor 150

In the disengagement step, after the wheel rod 120 and the insertion rod 140 are connected, the steering motor 130 may rotate the wheel rod 120 in the opposite direction and rotate the insertion rod 140 interlocked with the wheel rod 120 so that the insertion rod 140 may be separated from the receiving member 210. As a result, the steering part 100 and the cover part 200 may be disengaged.

In addition, the disengagement step may further include separating the wheel rod 120 and the insertion rod 140 from each other after the disengagement of the steering part 100 and the cover part 200.

The method of manufacturing a movable object according to exemplary embodiments of the present disclosure may be simplified by engaging or disengaging the steering part 100 and the cover part 200 using the steering motor 130, thereby reducing the assembly time and cost required.

As set forth above, according to exemplary embodiments of the present disclosure, the assembly method and assembly structure of the movable object may be simplified by assembling the steering part and the cover part using the steering motor, and the time and manpower required for assembly may be reduced.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method of manufacturing a movable object, the method comprising:
    a preparation step of preparing a wheel, a steering part including a wheel rod connected to the wheel and a steering motor rotating the wheel rod to steer the wheel, and a cover part including a receiving member in which a portion of the steering part is received;
    an engagement step of joining the steering part and the cover part by engaging the steering part with the receiving member; and
    a disengagement step of disengaging the steering part from the cover part by separating the steering part from the receiving member,
    wherein in the engagement step, the steering part and the cover part are joined by driving the steering motor to rotate the wheel rod in one direction.

2. The method according to claim 1, wherein in the disengagement step, the steering part and the cover part are disengaged by driving the steering motor to rotate the wheel rod in an opposite direction.

3. The method according to claim 1, wherein:
    the steering part further includes an insertion rod connectable to an upper region of the wheel rod, and
    the engagement step further includes inserting the insertion rod into the receiving member by driving the steering motor to rotate the wheel rod in the one direction.

4. The method according to claim 3, wherein the disengagement step further includes separating the insertion rod from the receiving member by driving the steering motor to rotate the wheel rod in the opposite direction.

5. The method according to claim 3, wherein the engagement step further includes connecting the wheel rod to the insertion rod to allow the wheel rod and the insertion rod to rotate together.

6. The method according to claim 4, wherein the disengagement step further includes separating the wheel rod from the insertion rod.

7. The method according to claim 1, wherein in the engagement step, the steering part and the cover part are joined after the wheel rod is decoupled from the steering motor so that power transfer from the steering motor to the wheel rod is blocked.

8. The method according to claim 7, wherein in the engagement step, after the steering part and the cover part are joined, the wheel rod and the steering motor are coupled so that power transfer is made from the steering motor to the wheel rod.

9. The method according to claim 1, further comprising an alignment step of aligning each wheel which is provided on the steering part,
    wherein the alignment step is performed between the preparation step and the engagement step.

* * * * *